UNITED STATES PATENT OFFICE 2,179,896

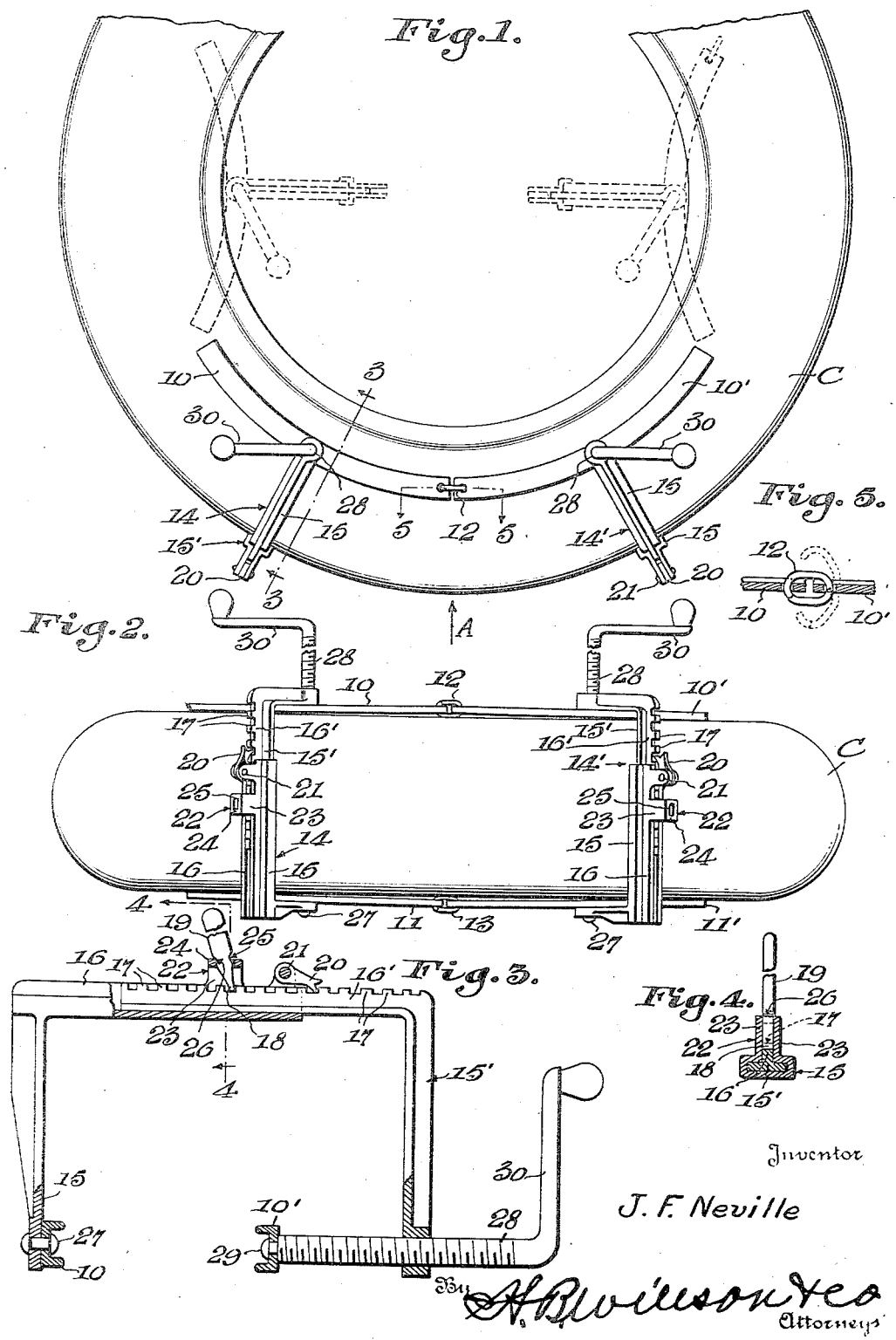

TIRE TOOL

Joseph F. Neville, Evanston, Wyo.

Application March 2, 1938, Serial No. 193,556

4 Claims. (Cl. 81—15.3)

The invention aims primarily to provide a new and improved tool for the purpose of laterally collapsing automobile tires, allowing the beads of any collapsed tire to be readily received in the drop-center of a conventional drop-center rim, thus permitting more easy application and removal of tires.

Another object of the invention is to provide a novel construction which is also useable as a casing expander when the interior of a tire casing is to be examined, repaired, etc.

With the foregoing in view, the invention resides in the novel subject matter hereinafter described and claimed, description being accomplished by reference to the accompanying drawing.

Fig. 1 is a side elevation showing the invention engaged with a tire, in full lines, for laterally collapsing said tire, and in dotted lines showing the invention arranged for expanding the casing.

Fig. 2 is an edge view looking in the direction indicated by the arrow A of Fig. 1.

Fig. 3 is a transverse section partly in elevation on line 3—3 of Fig. 1, showing the construction of one of the clamps.

Fig. 4 is a detail sectional view on line 4—4 of Fig. 3.

Fig. 5 is a detail sectional view on line 5—5 of Fig. 1 showing one of the bar-connecting links, and in dotted lines showing this link opened to permit bar disconnection.

In the drawing above briefly described, a preferred construction has been illustrated and while this construction will be rather specifically explained, it is to be understood that variations may be made within the scope of the invention as claimed.

I provide a pair of arcuate bars 10 and 10' for disposition at one side of a tire casing C, and provide another pair of arcuate bars 11 and 11' for disposition at the opposite side of said casing. The inner ends of the bars 10 and 10' are directly connected with each other by some appropriate means such as a chain link 12 which may be readily opened when said bars are to be disconnected from each other to permit use of the invention as a casing expander in the manner shown in dotted lines in Fig. 1. The inner ends of the bars 11 and 11' are similarly connected as shown at 13. One arched clamp 14 connects the bars 10 and 11 and another clamp 14' connects the bars 10' and 11', said clamps being of such construction that they can readily move the two pairs of bars toward each other to transversely collapse the tire or may separate the bars to laterally spread the casing when its interior is to be examined or repaired. When the bars are to be used in this latter manner, the links 12 and 13 are simply opened to allow disconnection of the bars 10 and 10' and the bars 11 and 11'.

In the present disclosure, the clamps 14 and 14' are identical and a description of one will therefore suffice for both. The arched formation of this clamp is formed jointly by two L-shaped members 15 and 15', the crown portions of which are slidably engaged with each other. The crown portion 16 of the member 15 is longitudinally channeled and is preferably of T-shape in transverse section, and the crown portion 16' of the member 15' is slidably received in the channel of said portion 16, the longitudinal edge of said portion 16' at the open side of the channel being provided with spaced teeth 17 with which the inner end 18 of a lever 19 may be engaged for relatively sliding the two members 15 and 15'. A dog 20 which is pivoted at 21 to the crown portion 16 of the member 15 is also engageable with the teeth 17 to hold the two members 15 and 15' in any positions to which they may be moved by the lever 19. This dog is swingable to either side of its pivot to hold the members 15 and 15' whether the clamp be used to transversely contract the tire or to transversely expand the same.

The crown portion 16 is provided with a rest 22 upon which to fulcrum the lever 19 while operating the latter, said rest preferably comprising two side plates 23 projecting outwardly from the side walls of the channel of the crown portion 16, and a web 24 integrally connecting the outer ends of said side plates 23, said web 24 having an opening 25 through which the lever end 18 is insertible for coaction with the teeth 17 to move the members 15 and 15' either inwardly or outwardly. The opposite edges of the lever 19 are preferably formed with notches 26 to rock on the end walls of the opening 25, preventing the lever end 19 from slipping out of engagement with the teeth 17. While the lever is preferably operated by hand, it might of course be foot-actuated.

The member 15 is directly pivoted at 27 by a rivet or the like, to the bar 11 or 11' as the case may be, and the member 15' carries a screw 28, the inner end of which is provided with a swiveled connection 29 with the bar 10 or 10', the outer end of the screw 28 being provided with a hand crank 30.

Either the screw 28 or the lever 19, or both, may be used in relatively moving the arcuate bars to transversely collapse or transversely expand the casing, as required.

From the foregoing, taken in connection with the accompanying drawing, it will be seen that novel and advantageous provision has been made for carrying out the objects of the invention, and while preferred details have been shown, attention is again invited to the possibility of making variations within the scope of the invention as claimed. Obviously, the device is useable whether the wheel be on the car or removed therefrom, operation being effected by hand or foot as desired.

I claim:

1. A tool for laterally collapsing a tire casing to allow easy reception of its beads in the drop center of a rim, said tool comprising one pair of arcuate bars for disposition at one side of the casing, an additional pair of arcuate bars for disposition at the other side of said casing, means directly connecting the inner ends of the bars of said one pair with each other, means directly connecting the inner ends of the bars of said additional pair with each other, one arched clamp having one of its ends connected to one bar of said one pair and having its other end connected to the corresponding bar of said additional pair, and a second arched clamp having its ends connected to the other bars of said pairs.

2. A tool for laterally collapsing a tire casing to allow easy reception of its beads in the drop center of a rim, said tool comprising one pair of arcuate bars for disposition at one side of the casing, an additional pair of arcuate bars for disposition at the other side of said casing, means directly and detachably connecting the inner ends of the bars of said one pair with each other, means directly and detachably connecting the inner ends of the bars of said additional pair with each other, one arched clamp having one of its ends connected to one bar of said one pair and having its other end connected to the corresponding bar of said additional pair, and a second arched clamp having its ends connected to the other bars of said pairs, said clamps being constructed to move the two pairs of bars away from each other as well as toward each other, whereby when the bars of said pairs are detached from each other and placed between the beads, the tool may be used as a casing expander.

3. A tool for laterally collapsing a tire casing to allow easy reception of its beads in the drop center of a rim, said tool comprising one pair of arcuate bars for disposition at one side of the casing, an additional pair of arcuate bars for disposition at the other side of said casing, a chain link directly connecting the inner ends of the bars of said one pair with each other, a second chain link directly connecting the inner ends of the bars of said additional pair with each other, one arched clamp having one of its ends connected to one bar of said one pair and having its other end connected to the corresponding bar of said additional pair, and a second arched clamp having its ends connected to the other bars of said pairs.

4. A tool for laterally collapsing a tire casing to allow easy reception of its beads in the drop center of a rim, said tool comprising one pair of arcuate bars for disposition at one side of the casing, an additional pair of arcuate bars for disposition at the other side of said casing, a split chain link directly and detachably connecting the inner ends of the bars of said one pair with each other, a second split chain link directly and detachably connecting the inner ends of the bars of said additional pair with each other, one arched clamp having one of its ends connected to one bar of said one pair and having its other end connected to the corresponding bar of said additional pair, and a second arched clamp having its ends connected to the other bars of said pairs, said clamps being constructed to move the two pairs of bars away from each other as well as toward each other, whereby when the bars of said pairs are detached from each other and placed between the beads, the tool may be used as a casing expander.

JOSEPH F. NEVILLE.